US012000938B2

(12) United States Patent
Werner et al.

(10) Patent No.: US 12,000,938 B2
(45) Date of Patent: Jun. 4, 2024

(54) MACHINE LEARNING ASSISTED SATELLITE BASED POSITIONING

(71) Applicant: Apple Inc., Cupertino, CA (US)

(72) Inventors: Benjamin A. Werner, San Jose, CA (US); Brent M. Ledvina, San Francisco, CA (US); Dennis P. Hilgenberg, San Jose, CA (US); Aarti Sathyanarayana, Shoreview, MN (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/107,496

(22) Filed: Feb. 8, 2023

(65) Prior Publication Data

US 2023/0184961 A1 Jun. 15, 2023

Related U.S. Application Data

(62) Division of application No. 16/536,234, filed on Aug. 8, 2019, now Pat. No. 11,604,287.

(60) Provisional application No. 62/716,912, filed on Aug. 9, 2018.

(51) Int. Cl.
*G01S 19/42* (2010.01)
*G01S 19/39* (2010.01)
*G06N 20/00* (2019.01)

(52) U.S. Cl.
CPC .......... *G01S 19/428* (2013.01); *G01S 19/393* (2019.08); *G06N 20/00* (2019.01)

(58) Field of Classification Search
None
See application file for complete search history.

(56) References Cited

U.S. PATENT DOCUMENTS

| 2013/0053067 | A1 | 2/2013 | Aggarwal |
| 2015/0119068 | A1 | 4/2015 | Kudekar |
| 2015/0348409 | A1 | 12/2015 | Lykkja |
| 2016/0259061 | A1 * | 9/2016 | Carter ................... G01S 19/28 |
| 2019/0353800 | A1 | 11/2019 | Nirula |
| 2019/0378423 | A1 * | 12/2019 | Bachrach ................ H04L 67/52 |

* cited by examiner

*Primary Examiner* — Whitney Moore
(74) *Attorney, Agent, or Firm* — BAKERHOSTETLER

(57) ABSTRACT

A device implementing a system for estimating device location includes at least one processor configured to receive an estimated position based on a positioning system comprising a Global Navigation Satellite System (GNSS) satellite, and receive a set of parameters associated with the estimated position. The processor is further configured to apply the set of parameters and the estimated position to a machine learning model, the machine learning model having been trained based at least on a position of a receiving device relative to the GNSS satellite. The processor is further configured to provide the estimated position and an output of the machine learning model to a Kalman filter, and provide an estimated device location based on an output of the Kalman filter.

20 Claims, 8 Drawing Sheets

US 12,000,938 B2

MACHINE LEARNING ASSISTED SATELLITE BASED POSITIONING

CROSS-REFERENCE TO RELATED APPLICATIONS

This application is a divisional of U.S. patent application Ser. No. 16/536,234, entitled "MACHINE LEARNING ASSISTED SATELLITE BASED POSITIONING," filed Aug. 8, 2019, which claims the benefit of priority to U.S. Provisional Patent Application Ser. No. 62/716,912, entitled "MACHINE LEARNING ASSISTED SATELLITE BASED POSITIONING," filed Aug. 9, 2018, the disclosure of each of which is hereby incorporated herein in its entirety.

TECHNICAL FIELD

The present description relates generally to satellite based positioning, including using machine learning to assist with satellite based positioning to estimate device location.

BACKGROUND

An electronic device such as a laptop, tablet, smartphone, a wearable device or a navigation system of a vehicle to which a mobile device is attached may include a GNSS receiver, which is configured to receive signals from Global Navigation Satellite System (GNSS) satellites, to estimate the location of the electronic device.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
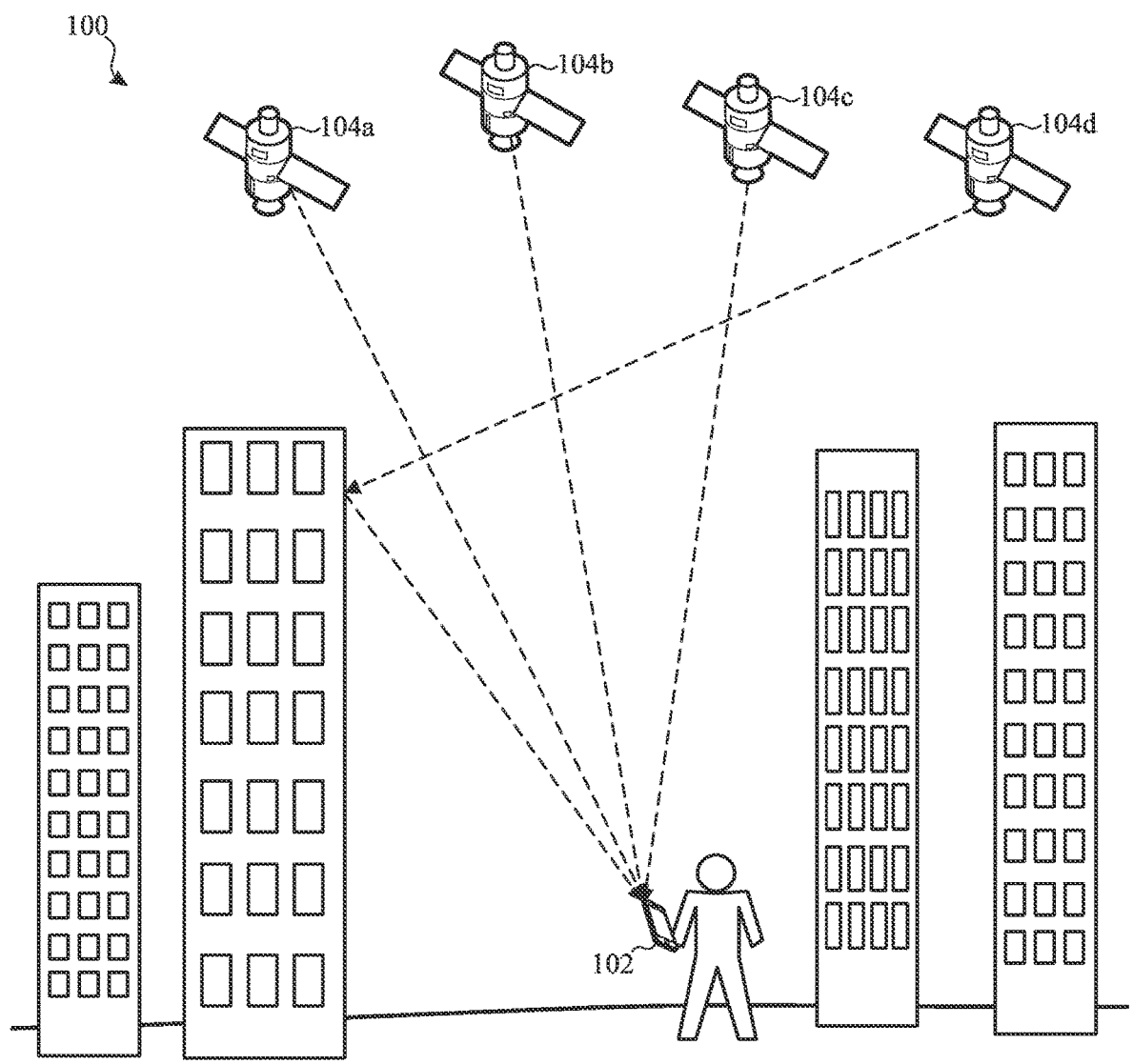
FIG. 1 illustrates an example environment in which an electronic device may use a machine learning model in conjunction with GNSS positioning to estimate device location in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A location estimation system implemented by an electronic device may include a GNSS receiver, which is configured to receive signals from Global Navigation Satellite System (GNSS) satellites, to estimate the location of the electronic device. However, computing an accurate position solution (e.g., an estimated device location) can be difficult in certain environments. Challenging signal environments (e.g., urban canyons, areas of dense foliage, areas near or within structures such as buildings, and/or other areas that may interfere with line of sight reception of signals) can complicate the computation of an accurate position solution. Another example of a challenging signal environment is outright blockage of the line of sight signal, making the tracked signal solely that of a reflection (e.g., this may only be single path from a GNSS transmitter to a receiver, but may still be misinterpreted by a receiver that uses a simple line of sight model for measurements). In the above-mentioned environments, fewer signals are available (e.g., due to the interference caused by the environments), and those signals that are available tend to yield less accurate measurements on a device due to environmental attenuation. One example of interference for GNSS signals is multipath error, for example, where signals are reflected, refracted and/or absorbed, resulting in multiple paths of arrival for the electronic device.

The subject system implements a machine learning model (e.g., or machine learning method(s)) to assist with GNSS positioning, e.g. in order to compensate for the incomplete and/or distorted GNSS signal information in these challenging signal environments. The subject system generates a machine learning model, for example, by comparing GNSS position estimates (e.g., or estimated measurement errors) as provided by a GNSS positioning system with corresponding reference position estimates as provided by a reference positioning system (e.g., where the reference positions correspond to ground truth data). In one or more implementations, the ground truth data may be better (e.g., significantly better) than what a mobile device alone can perform in most non-aided mode(s) of operation. For example, a mobile phone in a car may be significantly better aided than a pedestrian device, because the motion model for a vehicle is more constrained, and has aiding data in the form of maps and sensor inputs.

The machine learning model is trained based on comparisons between the GNSS position estimates and reference positioning system estimates at respective times, together with parameter(s) indicating a position of the device relative to one or more GNSS satellites of the GNSS positioning system at the respective times that the measurements were captured.

In one or more implementations, an input to the machine learning model (e.g., or method) may be sets of measurement errors. In this case, measurements may refer to pseudorange and range rate measurements.

Pseudorange measurements are range measurements plus a time offset corresponding to the difference between the real GNSS time and the GNSS time as estimated by a GNSS receiver, as follows:

Pseudorange=range+clock_offset+range_error

Range rate measurements are the rate of pseudoranges with respect to time, and include the changes in range due to satellite motion, user motion, and changes in the time estimate (e.g., referred to as clock drift), as follows:

Rangerate=($v$_sat−$v$_user)·(unit vector towards satellite)+clock_drift+range_rate_error In this manner, it is possible to form the measurement errors based on the reference position, the known motion of the satellites, and an offline estimate of the receiver clock error, as follows:

Range_error=Pseudorange−range−clock_offset

Rangerate_error=range_rate−·($v$_sat−$v$_user,unit vec towards sat)−clock_drift

Thus, in one or more implementations, the inputs to the machine learning model may be these pseudorange errors and range rate errors. In order to predict pseudorange errors and range rate errors, values such as azimuth and elevation, a coarse position estimate, and other observed quantities that are made alongside the measurements, such a signal strength (C/N0) and multipath indications may be used.

In one or more implementations, the machine learning model is generated for local storage on client devices, such that outputs of the locally-stored machine learning model can be used to replace and/or supplement subsequent position estimates (e.g., or estimated measurement errors) provided by the GNSS positioning system, and/or to assist with position estimate determinations for the GNSS positioning system. In this manner, the machine learning model can be used by the GNSS positioning system to compensate for incomplete and/or distorted GNSS signal information, e.g., in the aforementioned challenging signal environments.

FIG. 1 illustrates an example environment in which an electronic device may use a machine learning model in conjunction with GNSS positioning to estimate device location in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The environment 100 includes an electronic device 102 and GNSS satellites 104a, 104b, 104c and 104d (hereinafter "the GNSS satellites 104a-104d"). For explanatory purposes, the environment 100 is illustrated in FIG. 1 as including the one electronic device 102 and the four GNSS satellites 104a-104d; however, the environment 100 may include any number of electronic devices and any number of GNSS satellites.

The electronic device 102 may be, for example, a portable computing device such as a laptop computer, a smartphone, a device embedded in, installed in, and/or coupled to a vehicle, a peripheral device (e.g., a digital camera, headphones), a tablet device, a wearable device such as a smartwatch, a band, and the like, or any other appropriate device that includes, for example, one or more wireless interfaces, such as GNSS radios, WLAN radios, cellular radios, Bluetooth radios, Zigbee radios, near field communication (NFC) radios, and/or other wireless radios. In FIG. 1, by way of example, the electronic device 102 is depicted as a smartphone. The electronic device 102 may be, and/or may include all or part of, the electronic device discussed below with respect to FIG. 3, and/or the electronic system discussed below with respect to FIG. 8.

In the example of FIG. 1, the electronic device 102 is held by or otherwise coupled to (e.g., via pocket or strap) a user. However, the electronic device 102 may be coupled to and/or contained within a vehicle. In the example of FIG. 1, the user is traveling by foot (e.g., walking). However, the user may be traveling within a vehicle (e.g., a land vehicle such as an automobile, a motorcycle, a bicycle, or a watercraft or an aircraft vehicle), through water, e.g. swimming, or by other means.

In the environment 100, the electronic device 102 may determine its location based on signals received from GNSS satellites 104a-104d. For example, the GNSS satellites 104a-104d may be compatible with one or more of the Global Positioning System (GPS), the Globalnaya Navigazionnaya Sputnikovaya Sistema (GLONASS), the Galileo positioning system, and/or generally any positioning system.

For example, the electronic device 102 may determine its respective location (e.g., longitude, latitude, and altitude/elevation) using signals received from the GNSS satellites 104a-104d. As discussed herein, the electronic device 102 may use a machine learning model (e.g., stored in local memory of the electronic device 102) in conjunction GNSS position estimates (e.g., position estimates determined based on signals received from the GNSS satellites 104a-104d) to estimate device location.

Other positioning technologies (not shown) may be used independent of or in conjunction with GNSS (e.g., the GNSS satellites 104a-104d) to determine device location. For example, the location of the electronic device 102 may be determined based on time of arrival, angle of arrival, and/or signal strength of signals received from wireless access points which may have known locations (e.g., within a building or store, mounted on street posts, etc.). Alternatively or in addition, positioning technologies such as, but not limited to, cellular phone signal positioning (e.g., positioning using cellular network and mobile device signals), Bluetooth signal positioning and/or image recognition positioning may be used to determine device location.

Moreover, the electronic device 102 may implement an inertial navigation system (INS). The INS uses device sensor(s) (e.g., motion sensors such as accelerometers, gyroscope) to calculate device state (e.g., device position, velocity, attitude) and/or user state (e.g., user velocity, position) for supplementing location data provided by the above-mentioned positioning technologies in order to estimate device location. In one or more implementations, INS may be used by the reference positioning system described herein.

Figure 2:
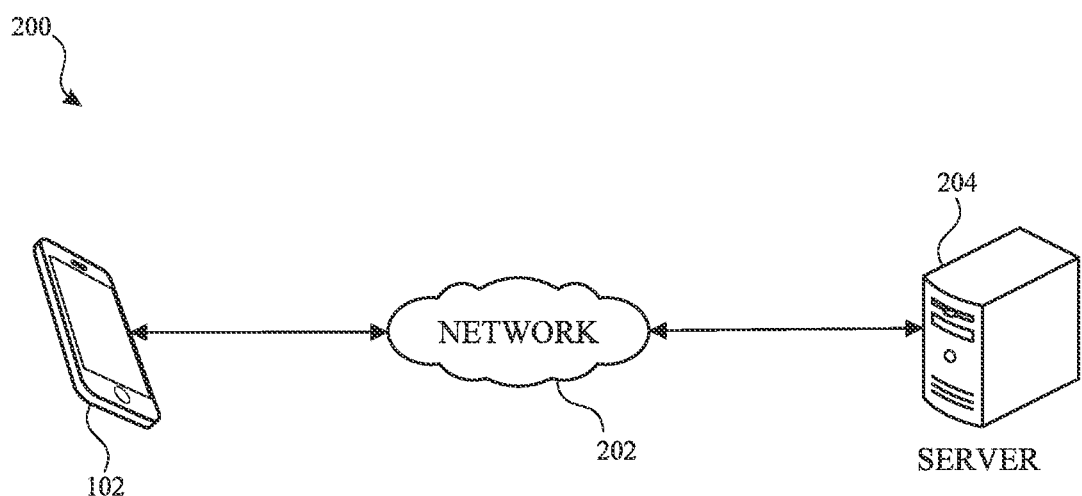
FIG. 2 illustrates an example network environment for providing a machine learning model to an electronic device for use with GNSS positioning in accordance with one or more implementations.

FIG. 2 illustrates an example network environment 200 for providing a machine learning model to an electronic device for use with GNSS positioning in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 200 includes the electronic device 102, a network 202 and a server 204. The network 202 may communicatively (directly or indirectly) couple, for example, the electronic device 102 and the server 204. In one or more implementations, the network 202 may be an interconnected network of devices that may include, and/or may be communicatively coupled to, the Internet. For explanatory purposes, the network environment 200 is illustrated in FIG. 2 as including a single electronic device 102 and a single server 204; however, the network environment 200 may include any number of electronic devices and any number of servers.

The electronic device 102 may communicate or otherwise interact with the server 204, for example, to receive a machine learning model from the server 204, where the machine learning model is used in conjunction with GNSS positioning to estimate device location. The electronic device 102 may be, and/or may include all or part of, the device discussed below with respect to FIG. 3, and/or the electronic system discussed below with respect to FIG. 8.

The server 204 may be, and/or may include all or part of the electronic system discussed below with respect to FIG. 8. The server 204 may include one or more servers, such as a cloud of servers, that may be used to generate the machine learning model. For example, the server 204 may generate the machine learning model based on GNSS receiver computations and based on reference data corresponding to ground truth information, as discussed further below with respect to FIGS. 4A-4B. In one or more implementations, the server 204 may provide the generated machine learning model to the electronic device 102, e.g., for local storage on the electronic device 102.

For explanatory purposes, a single server 204 is shown and discussed with respect to various operations, such as generating the machine learning model and providing the machine learning model. However, these and other operations discussed herein may be performed by one or more servers, and each different operation may be performed by the same or different servers. In one or more implementations, the machine learning model may be directly stored on the electronic device 102 before the electronic device 102 is provided to a user, e.g. at or around the time of manufacture of the electronic device 102.

As described herein, different interactions may occur between the electronic device 102 and the server 204. For example, one class of interactions may be the uploading of reference position data, along with measurements and associated measurement quantities. This may happen periodically, for example, based on predefined settings of the electronic device 102. For example, when the electronic device 102 is plugged in at night (e.g., a time during which power may not be a concern), and/or when the electronic device 102 is paired with a Wi-Fi base station. On the other hand, the server 204 may be responsible for updating machine learning model(s), for example, for most (or all) areas possible using data collected since a last processing.

Another class of interactions may be the download of machine learning model(s), for specific areas. For example, these machine learning model(s) may be downloaded after the position of the electronic device 102 has been determined at a coarse level (e.g., a predefined level of accuracy).

In one or more implementations, in addition to the network-based learning model where devices (e.g., the electronic device 102) help other devices, an electronic device may also help itself when traveling in the same areas, but with improved methods of navigation (e.g., collecting learning data while driving with INS enabled and/or using models when engaging in pedestrian navigation in the same area).

Figure 3:
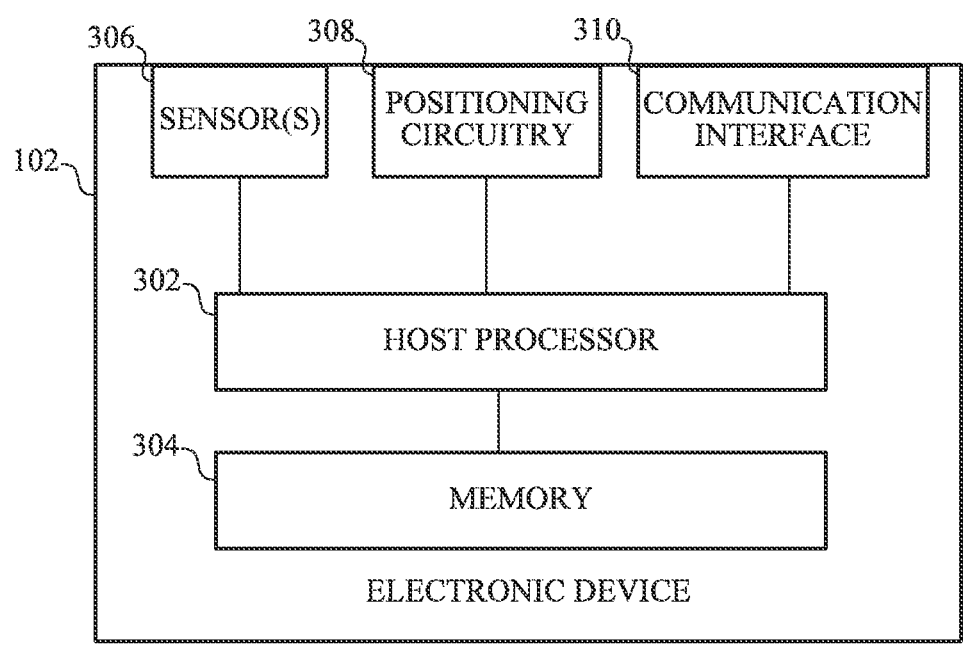
FIG. 3 illustrates an example electronic device that may implement the subject system for using a machine learning model in conjunction with GNSS positioning in accordance with one or more implementations.

FIG. 3 illustrates an example electronic device 102 that may implement the subject system for using a machine learning model in conjunction with GNSS positioning in accordance with one or more implementations. For explanatory purposes, FIG. 3 is primarily described herein with reference to the electronic device 102 of FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102 may include one or more of a host processor 302, a memory 304, one or more sensor(s) 306, positioning circuitry 308 and/or a communication interface 310. The host processor 302 may include suitable logic, circuitry, and/or code that enable processing data and/or controlling operations of the electronic device 102. In this regard, the host processor 302 may be enabled to provide control signals to various other components of the electronic device 102. The host processor 302 may also control transfers of data between various portions of the electronic device 102. The host processor 302 may further implement an operating system or may otherwise execute code to manage operations of the electronic device 102. In addition, the host processor 302 may implement a location estimator that is discussed further below with respect to FIG. 6.

The memory 304 may include suitable logic, circuitry, and/or code that enable storage of various types of information such as received data, generated data, code, and/or configuration information. The memory 304 may include, for example, random access memory (RAM), read-only memory (ROM), flash, and/or magnetic storage. In one or more implementations, the memory 304 may store a machine learning model (e.g., as provided by the server 204) for facilitating the estimation of device location. The memory 304 may further store GNSS receiver data, wireless network received data, sensor signal measurements and/or device location estimates, for example, based on a location of the electronic device 102.

The sensor(s) 306 may include one or more motion sensor(s), such as an accelerometer and/or a rate gyroscope. The motion sensor(s) may be used to facilitate movement and orientation related functions of the electronic device 102, for example, to detect movement, direction, and orientation of the electronic device 102.

Alternatively or in addition, the sensor(s) 306 may include one or more of a barometer, an electronic magnetometer, or generally any sensor that may be used to facilitate a positioning system. The barometer may be utilized to detect atmospheric pressure, for use in determining altitude change of the electronic device 102. The electronic magnetometer (e.g., an integrated circuit chip) may provide data used to determine the direction of magnetic North, for example to be used as an electronic compass.

The positioning circuitry 308 may be used in determining the location of the electronic device 102 based on positioning technology. For example, the positioning circuitry 308 may provide for one or more of GNSS positioning (e.g., via a GNSS receiver configured to receive signals from the GNSS satellites 104a-104d), wireless access point positioning (e.g., via a wireless network receiver configured to receive signals from the wireless access points 108a-108b), cellular phone signal positioning, Bluetooth signal positioning (e.g., via a Bluetooth receiver), image recognition positioning (e.g., via an image sensor), and/or an INS (e.g., via motion sensors such as an accelerometer and/or gyroscope).

The communication interface 310 may include suitable logic, circuitry, and/or code that enables wired or wireless communication, such as between the electronic device 102 and the server 204. The communication interface 310 may include, for example, one or more of a Bluetooth communication interface, an NFC interface, a Zigbee communication interface, a WLAN communication interface, a USB communication interface, a cellular interface, or generally any communication interface.

In one or more implementations, one or more of the host processor 302, the memory 304, the sensor(s) 306, the positioning circuitry 308, the communication interface 310, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 4A:
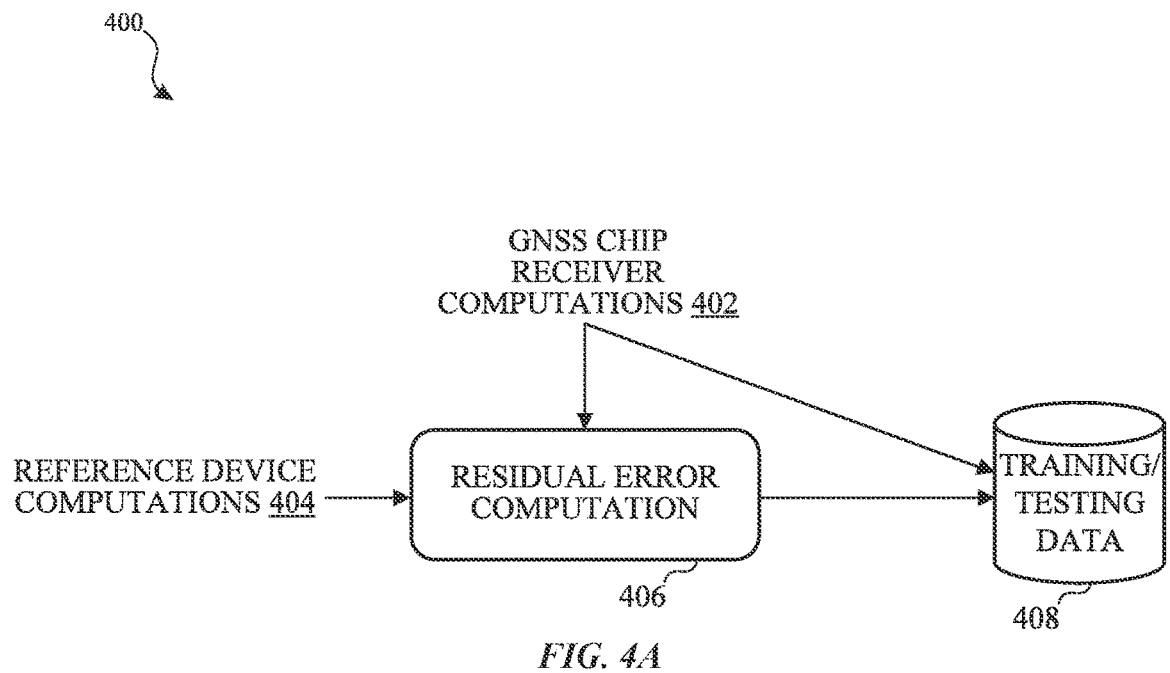
FIGS. 4A-4B illustrate example processes for obtaining input data, and generating a machine learning model based on the input data in accordance with one or more implementations.
Figure 4B:
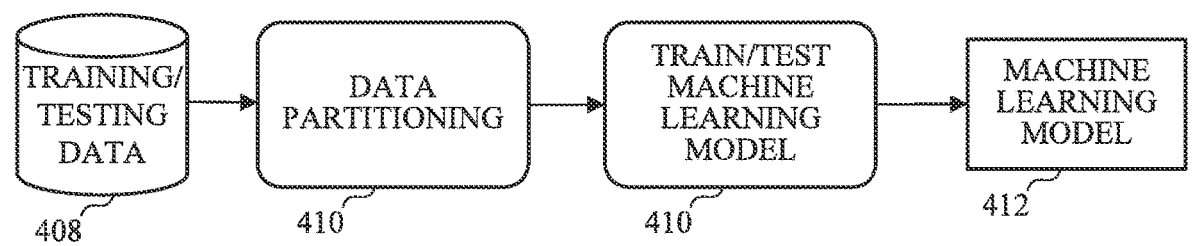

FIGS. 4A-4B illustrate example processes for obtaining input data, and generating a machine learning model based on the input data in accordance with one or more implementations. For explanatory purposes, the operations of the process 400 are described herein as occurring in serial, or linearly. However, multiple blocks of the process 400 may occur in parallel. In addition, the operations of the process 400 need not be performed in the order shown and/or one or more operations of the process 400 need not be performed and/or can be replaced by other operations.

FIGS. 4A-4B correspond to generating the machine learning model 412, by using estimates provided by a GNSS positioning system and a reference positioning system. In this regard, FIG. 4A illustrates an example of obtaining input data (e.g., training/testing data 408) for generating the machine learning model 412. In one or more implementations, the process 400 collects GNSS receiver computations 402, together with reference device computations 404, at various locations along a route. For example, an operator or operator-less vehicle may traverse the route, where the operator and/or vehicle are equipped with a GNSS receiver (e.g., a mobile device with a GNSS receiver, such as the electronic device 102) and a reference device which includes one or more high-precision location sensors that have a greater precision than that of the GNSS receiver, and/or are not impacted by the aforementioned challenging signal environments. In one or more implementations, the reference device may determine position estimates independent of the GNSS satellites and/or GNSS system. For example, the reference device may include and/or be communicatively coupled to a directional measurement device, such as a compass, and may include and/or be communicatively coupled to a distance measurement device, such as wheel with a known circumference, and the reference device may determine position estimates based on measurements received from the compass and/or distance measurement device.

At multiple locations along the route, the operator may collect location estimates (e.g., and/or raw GNSS measurements such as pseudorange and range rate) from the GNSS receiver (e.g., the GNSS receiver computations 402) as well as location estimates from the high-precision location sensor of the reference device (e.g., the reference device computations 404). For example, the location estimates may correspond to longitude, latitude and/or altitude/elevation estimates of the GNSS receiver, and these estimates may be included as part of the training/testing data 408.

In addition, the training/testing data 408 may include other parameters provided by the GNSS receiver computations 402, e.g., parameters used by the GNSS receiver to determine the location estimates. For example, these parameters may indicate or otherwise correspond to a position of the GNSS receiver (e.g., the mobile device) relative to the GNSS satellite (e.g., one of the GNSS satellites 104a-104d) providing the line of sight signals for device location estimation.

Examples of these parameters include, but are not limited to: pseudorange (e.g., the distance between the GNSS receiver and the GNSS satellite); pseudorange uncertainty (e.g., confidence value for the pseudorange); range rate (e.g., the rate of change of the distance between the GNSS receiver and the GNSS satellite); range rate uncertainty (e.g., confidence value for the pseudorange); a multipath indicator (e.g., a value of present, not present or unknown with respect to whether the signal provided by the GNSS satellite to the GNSS receiver is a multipath signal); elevation above horizon (e.g., of the GNSS satellite); azimuth (e.g., angle from north+vertical towards east); whether the measurement was used in the generation of a position fix on the GNSS receiver; and/or position fix location (corresponding to the above-mentioned location estimate as provided by the GNSS receiver, e.g., latitude, longitude, height above ellipsoid).

Other parameters that may be included as part of the training/testing data 408 include: a satellite identifier (e.g., constellation, band, carrier frequency and/or satellite number) for the GNSS satellite; measurement latency; a carrier tracking state (e.g., tracking, cycle slip detected, no cycle slips); carrier tracking uncertainty; position fix uncertainty (e.g., horizontal, vertical components); number of satellites used in the position fix; and/or horizontal dilution of precision (HDOP).

Moreover, the process 400 performs residual error computation(s) 406, so as to determine errors in the location estimates (e.g., and/or measurement errors) as provided by the GNSS receiver. Residual error computation(s) 406 may be determined by comparing the GNSS receiver computations 402 with the reference device computations 404 (e.g., as provided by the reference device). Moreover, these location errors may be stored as part of the training/testing data (e.g., within a database) that is used to generate the machine learning model 412 as discussed below with respect to FIG. 4B.

Thus, the training/testing data 408 may include one of more of the above-mentioned parameters (e.g., included as part of the GNSS receiver computations) and an indication of the residual error computation(s) 406. As noted above, the training/testing data 408 may be obtained by an operator and/or vehicle equipped with the GNSS receiver (e.g. for providing the GNSS receiver computations 402) and the reference device (e.g., for providing the reference device computations 404). Moreover, the training/testing data 408 may be obtained across multiple, similarly-equipped operators/vehicles, such that the database of training/testing data 408 includes a sufficient amount of measurements in order to generate, train and/or test the machine learning model 412.

In addition or alternative to the above-described operator and/or vehicle example, it is possible for the reference data to be provided in conjunction with known road networks corresponding to map data. In this example, the known road networks may correspond to the reference device computations 404, and the GNSS receiver computations 402 may be provided in a crowd-sourced manner, where locations along the known road networks are compared with location estimates provided by the devices of end users to determine the residual error (e.g., the electronic device 102). This data, and one or more of the other aforementioned parameters, may be collected and stored as the training/testing data 408, in a manner which preserves end user anonymity and privacy.

FIG. 4B illustrates an example of generating the machine learning model 412, for example, based on the training/testing data 408 obtained from the example process of FIG. 4A. In one or more implementations, the process 400 performs data partitioning on the training/testing data 408 (410), to determine a training dataset and a test dataset for the machine learning model 412.

For example, the training dataset as obtained from the training/testing data 408 may be used to initially train the machine learning model 412. On the other hand, the test dataset as obtained from the training/testing data 408 may be used to tune the machine learning model 412 based on the initial training. Block 410 of the process 400 indicates training and testing of the machine learning model 412. Examples of the algorithms used for training and/or testing the machine learning model 412 include, but are not limited to, linear regression, boosted trees, multi-layer perceptron and/or random forest algorithms.

Thus, the machine learning model 412 is generated so as to determine an amount of error associated with the GNSS receiver computations 402 (e.g., corresponding to signals received from the GNSS satellite), such as based on the residual error between the GNSS position estimates and the reference device position estimates. The amount of error may be used to replace or supplement errors/uncertainty as provided by the GNSS receiver computations 402. For example, as noted above, the GNSS receiver computations 402 may include pseudorange uncertainty and/or range rate uncertainty (e.g., as determined in conjunction with the signals provided by the GNSS satellite). However, the generated machine learning model 412 may provide more accurate location error/uncertainty (e.g., based on the residual error determined from the GNSS position estimates and the reference device position estimates), which can be used to replace the pseudorange uncertainty and/or range rate uncertainty included with the GNSS receiver computations 402. Thus, the output of the machine learning model 412 may be used by a location estimator in order to facilitate device location estimation.

In one or more implementations, the machine learning model 412 may be updated with new measurement error data, so as to generate a new, updated machine learning model 412. For example, forming this type of update method may provide for improved maintainability and computational burden.

Figure 5:
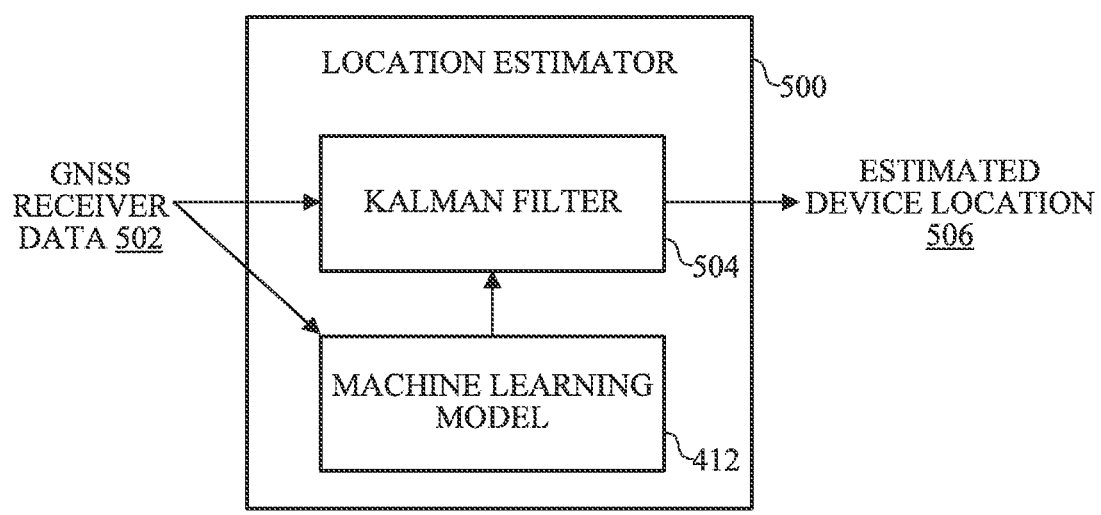
FIG. 5 illustrates an example of a location estimator of the subject system that may be implemented by an electronic device in accordance with one or more implementations.

In this regard, FIG. 5 illustrates an example of a location estimator 500 of the subject system that may be implemented by the electronic device 102 in accordance with one or more implementations. For example, the location estimator 500 can be implemented by one or more software modules running on the host processor 302 of the electronic device 102. In another example, the location estimator 500 can be implemented by custom hardware (e.g., one or more coprocessors) configured to execute the functionality of the location estimator 500. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The location estimator 500 of the electronic device 102 may include a Kalman filter 504 and the machine learning model 412. For example, the machine learning model 412 may have been stored on the server 204. In turn, the server 204 may provide a copy of the machine learning model 412 to the electronic device 102 via the network 202, and the electronic device 102 may locally store the machine learning model (e.g., in the memory 304 of the electronic device 102). In one or more implementations, the machine learning model may be stored on the electronic device 102 at or around the time of manufacture, e.g., before the electronic device 102 is provided to a user.

In one or more implementations, the machine learning model 412 may be specific to a particular city, where the electronic device 102 downloads the machine learning model 412 specific to the city (e.g., where respective machine learning models are trained and tested for different cities such as New York, San Francisco and Los Angeles). Alternatively or in addition, the machine learning model 412 may be specific to a type of environment, such that respective machine learning models are trained and tested for different environments (e.g., urban, suburban, rural). The electronic device 102 may be configured to download (e.g., automatically or by prompting the user) the appropriate machine learning model 412 based on the general location of the electronic device 102, and to locally store the machine learning model 412.

The location estimator 500 may receive GNSS receiver data 502 (e.g., which may be the same or similar to the GNSS receiver computations 402) as input, and may provide an estimated device location 506 as output. In one or more implementations, the GNSS receiver data 502 may be received from a GNSS receiver (e.g., corresponding to the positioning circuitry 308).

The GNSS receiver data 502 may include parameters similar to those described above with respect to the GNSS receiver computations 402. For example, the parameters may be used to estimate the position of the electronic device 102 relative to a GNSS satellite (e.g., one of the GNSS satellites 104a-104d) associated with the GNSS receiver data 502. Such parameters may include, but are not limited to: pseudorange; pseudorange uncertainty; range rage; range rate uncertainty; a multipath indicator; elevation above horizon; azimuth; whether the measurement was used in the generation of a position fix on the GNSS receiver; position fix location; a satellite identifier for the GNSS satellite; measurement latency; a carrier tracking state; carrier tracking uncertainty; position fix uncertainty; number of satellites used in the position fix; and/or horizontal dilution of precision (HDOP).

In one or more implementations, the location estimator 500 may be configured to combine radionavigation signals (e.g., the GNSS receiver data 502) with additional sensor data (e.g., as detected by motion sensors on the electronic device 102). For example, the sensor data may include accelerometer measurements corresponding to acceleration of the electronic device 102, and/or gyroscope measurements corresponding to rotation rates of the electronic device 102. The sensor data may be used to improve the position solution by subtracting out antenna motion (e.g., a GNSS antenna) between epochs of sampled radionavigation measurements (e.g., GNSS measurements), effectively allowing multiple epochs of measurements to be statistically combined to reduce error. These techniques may be performed by an inertial navigation system (INS) implemented by the location estimator 500.

Moreover, the Kalman filter 504 may correspond to an algorithm that uses a series of measurements/signals (e.g., which may contain noise and other inaccuracies) observed over time, and that produces estimates of unknown variables (e.g., device and/or user state) which tend to be more accurate than those based on a single measurement alone (e.g., single GNSS measurements). Thus, measurements of GNSS receiver signals (e.g., the GNSS receiver data 502) may be used in the Kalman filter 504 with numerical integration of sensor measurements (e.g., as performed by the INS) to subtract out undesirable antenna motion between epochs.

To improve the availability and quality of position solutions, the output of the machine learning model 412 may be used to replace and/or supplement portions of the GNSS receiver data 502, as input to the Kalman filter 504. In this regard, the machine learning model 412 may also receive the GNSS receiver data 502, including the above-mentioned parameters.

As noted above, the machine learning model 412 may have been trained and tested based on similar parameters provided by the GNSS receiver computations 402 (e.g., with respect to the same GNSS satellite). The machine learning model 412 may be configured to output an amount of error for the GNSS receiver data 502 with respect with the GNSS satellite. This indication of error (e.g., as output by the machine learning model 412) may be a more accurate indication of error and/or uncertainty than the uncertainty parameters (e.g., pseudorange uncertainty, range rate uncertainty) included with the GNSS receiver data 502, as the indication of error output by the machine learning model 412 was determined based on comparisons with the reference device position estimates. Thus, the output of the machine learning model 412 may be used to replace, or to otherwise supplement, the pseudorange uncertainty and/or range rate uncertainty included with the GNSS receiver data 502. This may result in improved estimated device location 506, for example, by reducing horizontal positioning error.

For example, with respect to a particular GNSS satellite, the machine learning model 412 may determine location estimation error of 100 meters (e.g., high estimation error). Thus, the location estimator 500 may disregard and/or limit measurements corresponding to that GNSS satellite (e.g., regardless of the error/uncertainty indicated by with the GNSS receiver data 502 for the GNSS satellite). In another example, in a case the machine learning model 412 determines a location estimation error of 5 meters (e.g., low estimation error) for a GNSS satellite, the location estimator 500 may prioritize the measurements corresponding to the GNSS receiver data 502 of that GNSS satellite, in determining the estimated device location 506.

In addition or as an alternative to uncertainty/error values, the output of the machine learning model 412 may indicate a revised measurement for the location estimation included with the GNSS receiver data 502. For example, the machine learning model 412 may be configured to provide revised measurements for the longitude, latitude, and/or altitude/elevation information included with the GNSS receiver data 502. Thus, the output from the machine learning model 412 may replace or otherwise supplement the location estimation corresponding to the GNSS receiver data 502.

Alternatively or in addition, the output of the machine learning model 412 may indicate an order to use measurements of one GNSS satellite relative to another GNSS satellite(s) in the Kalman filter 504. For example, if the machine learning model 412 indicates a high confidence for a particular GNSS satellite, the measurements corresponding to that GNSS satellite may be given a higher priority (e.g., with respect to an ordering in the Kalman filter 504) relative to measurements of GNSS satellite(s) with lower confidence.

In one or more implementations, the output from the machine learning model 412 may indicate whether to blacklist a particular GNSS satellite(s). In such instances, the Kalman filter 504 may be configured to disregard measurements (e.g., location estimates) from those GNSS satellite(s). For example, if the measurements corresponding to a particular GNSS satellite are determined to have a large amount of residual error in a particular location, the particular GNSS satellite may be blacklisted for that particular location.

Although the location estimator 500 is illustrated as using a Kalman filter (e.g., element 504) for estimating device location, it is possible for the location estimator 500 to implement a different filter for estimating the device location. Such a filter may be used in lieu of, or as a supplement to, the Kalman filter 504. For example, a particle filter or any other type of filter configured to estimate device location, in conjunction with error/uncertainty values, may be used.

In one or more implementations, some of the GNSS receiver data 502 used by the machine learning model may be dependent on a coarse location of the receiver (e.g., azimuth, elevation and/or even latitude, longitude or position uncertainty). This information may be obtained from the Kalman filter 504, or from another Kalman filter (not shown) for coarse positioning that does not use the machine learning methods.

In one or more implementations, one of more of the location estimator 500, including the Kalman filter 504 and the machine learning model 412, are implemented as software instructions, stored in the memory 304, which when executed by the host processor 302, cause the host processor 302 to perform particular function(s).

In one or more implementations, one or more of the location estimator 500, the Kalman filter 504 and the machine learning model 412 may be implemented in software (e.g., subroutines and code), hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices), and/or a combination of both. In one or more implementations, some or all of the depicted components may share hardware and/or circuitry, and/or one or more of the depicted components may utilize dedicated hardware and/or circuitry. Additional features and functions of these modules according to various aspects of the subject technology are further described in the present disclosure.

Figure 6:
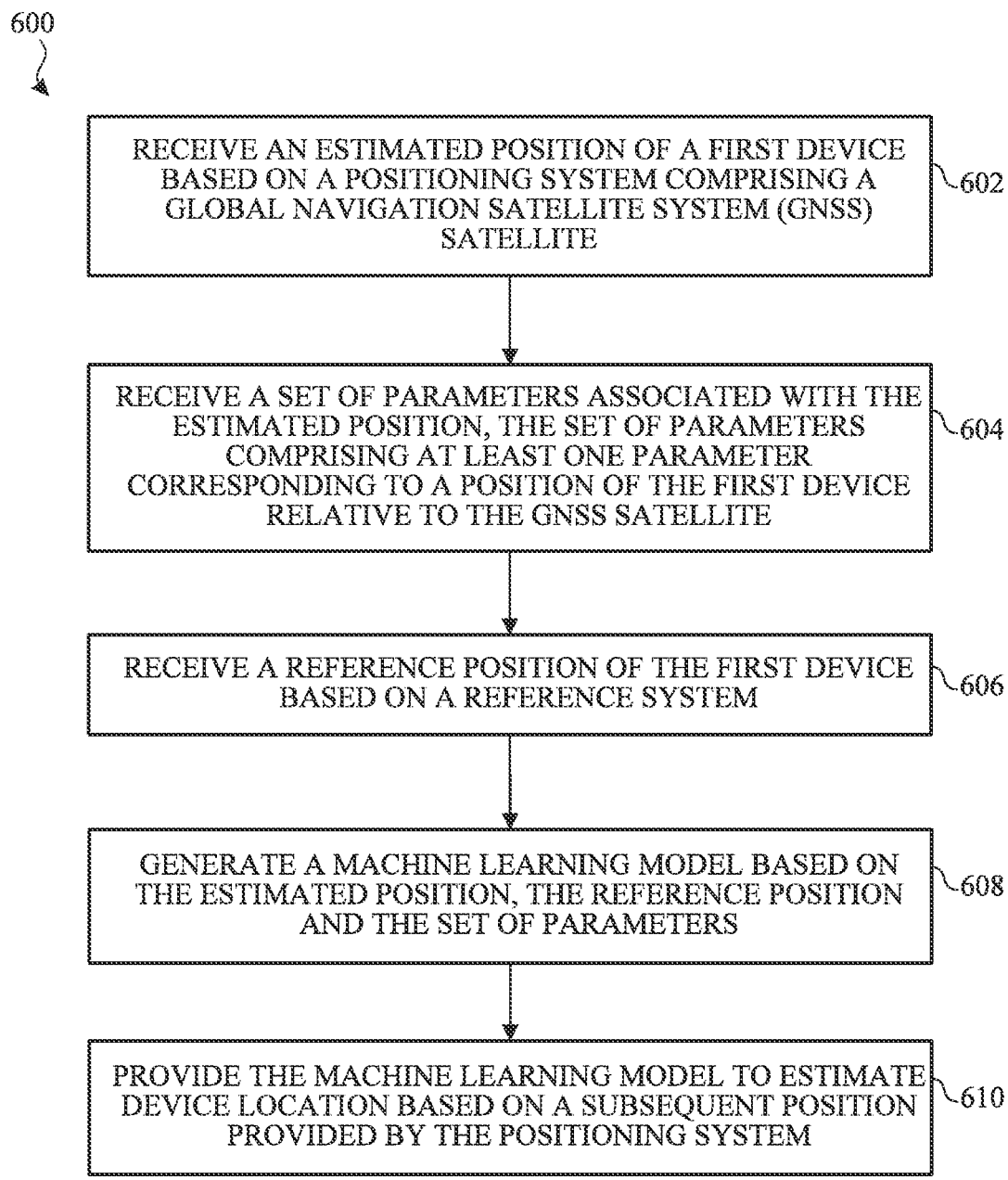
FIG. 6 illustrates a flow diagram of an example process for generating a machine learning model in accordance with one or more implementations.

FIG. 6 illustrates a flow diagram of an example process for generating a machine learning model in accordance with one or more implementations. For explanatory purposes, the process 600 is primarily described herein with reference to the server 204 of FIG. 2. However, the process 600 is not limited to the server 204, and one or more blocks (or operations) of the process 600 may be performed by one or more other components of the server 204, and/or by other suitable devices. Further for explanatory purposes, the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

The server 204 receives an estimated position of a first device (e.g., the GNSS receiver described in FIG. 4), such as the electronic device 102, based on a positioning system comprising a Global Navigation Satellite System (GNSS) satellite, such as one of the GNSS satellites 104a-104d (602). The server 204 receives a set of parameters associated with the estimated position, the set of parameters comprising at least one parameter corresponding to a position of the first device relative to the GNSS satellite (604).

The set of parameters may include at least one of an azimuth, an elevation, a pseudorange, an uncertainty associated with the pseudorange, a range rate, an uncertainty associated with the range rate or a multipath flag. The set of parameters may further include at least one of a satellite identifier for each GNSS satellite, a measurement latency, a carrier tracking state, a position fix location, an uncertainty associated with the position fix location, a number of satellites used in a position fix, or a horizontal dilution of precision.

In one or more implementations, the parameters are related to raw measurements from the GNSS satellite (e.g., from each of the GNSS satellites), as well as the position of the electronic device. For example, the raw measurements may correspond to measurements that are observed from RF signal processing and are relatively independent of the electronic device's knowledge of position.

The server 204 receives a reference position of the first device based on a reference positioning system, such as the reference device described above in FIG. 4 (606). The server 204 generates a machine learning model (e.g. the machine learning model 412) based on the estimated position, the reference position and the set of parameters (608). The server 204 provides the machine learning model 412 to estimate device location based on subsequent parameters and/or a subsequent position provided by the positioning system (610).

The subsequent parameters and/or position may be for a second device, such as the electronic device 102. The server 204 may provide the machine learning model 412 to the electronic device 102, for local storage on the electronic device 102.

The subsequent position and/or parameters and an output from the machine learning model 412 may be provided to a Kalman filter (e.g., the Kalman filter 504) to estimate device location. The output from the machine learning model 412 may indicate an amount of uncertainty for the subsequent position. Alternatively or in addition, the output from the machine learning model 412 may indicate a revised measurement for the subsequent position. Alternatively or in addition, the output from the machine learning model 412 may indicate an order to use the subsequent position in the Kalman filter 504, relative to other measurements used in the Kalman filter 504. Alternatively or in addition, the output from the machine learning model 412 may indicate whether the Kalman filter 504 is to disregard measurements from one or more GNSS satellites.

Figure 7:
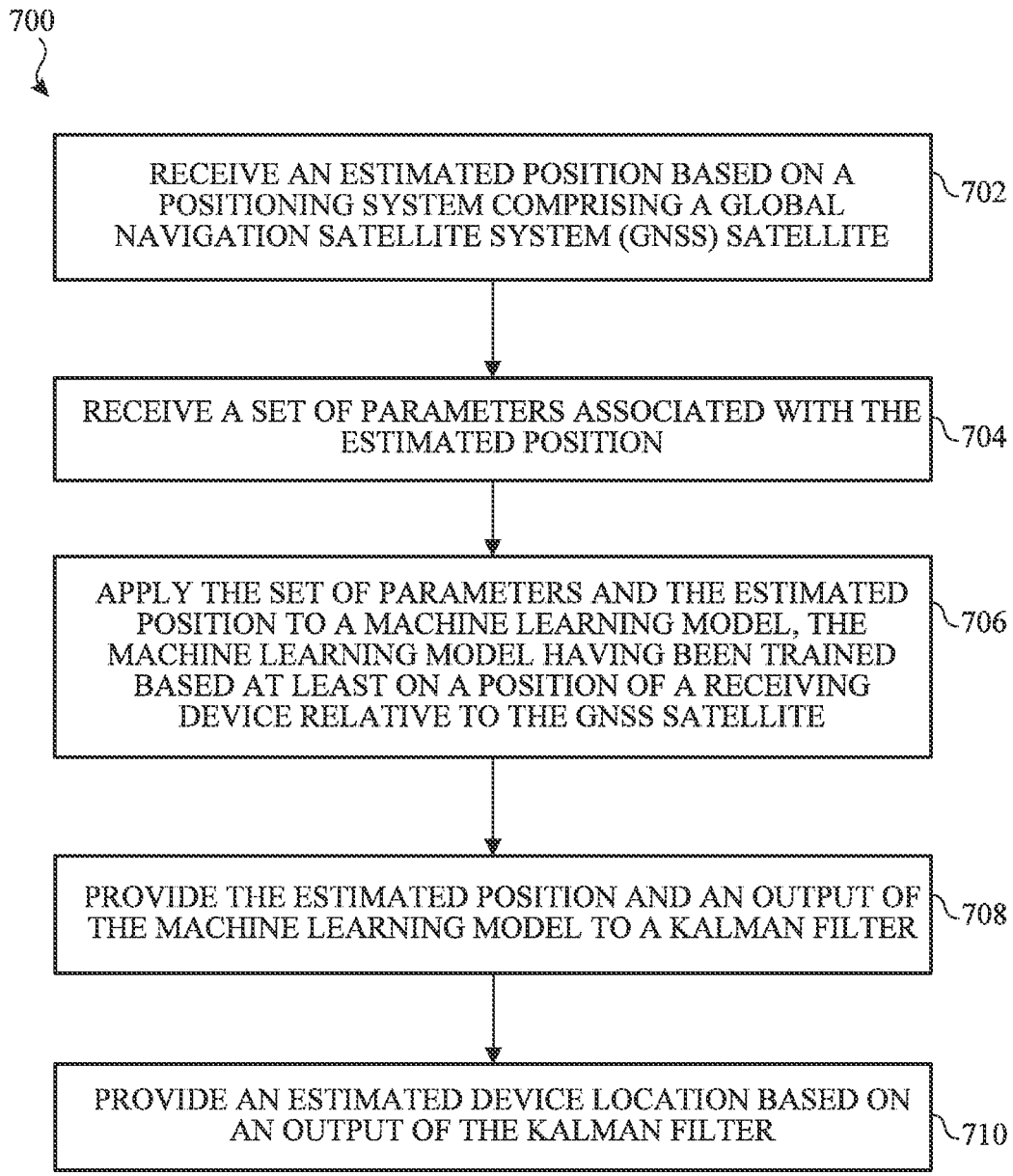
FIG. 7 illustrates a flow diagram of an example process for using a machine learning model in conjunction with GNSS positioning in accordance with one or more implementations.

FIG. 7 illustrates a flow diagram of an example process for using a machine learning model in conjunction with GNSS positioning in accordance with one or more implementations. For explanatory purposes, the process 700 is primarily described herein with reference to the electronic device 102 of FIG. 1. However, the process 700 is not limited to the electronic device 102, and one or more blocks (or operations) of the process 700 may be performed by one or more other components of the electronic device 102, and/or by other suitable devices. Further for explanatory purposes, the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

The electronic device 102 receives an estimated position based on a positioning system including one or more Global Navigation Satellite System (GNSS) satellites, such as the GNSS satellite 104d (702). The electronic device 102 receives a set of parameters associated with the estimated position and/or used to determine the estimated position (704). The parameters may also include parameters associated with a position of the receiving device relative to the GNSS satellite, such as at least one of an azimuth, an elevation, a pseudorange, an uncertainty associated with the pseudorange, a range rate, an uncertainty associated with the range rate or a multipath flag.

The electronic device 102 applies the set of parameters and the estimated position to a machine learning model (e.g., the machine learning model 412), the machine learning model 412 having been trained based at least on a position of a receiving device relative to the GNSS satellite (706). In one or more implementations, the parameters may be applied to the machine learning model 412 without applying the estimated position. The machine learning model 412 may have further been trained based on an estimated position of the receiving device provided by the positioning system, and based on a reference position of the receiving device provided by a reference positioning system. The machine learning model 412 may be stored in the memory (e.g., the memory 304) of the electronic device 102.

The electronic device 102 provides the estimated position and an output of the machine learning model 412 to a Kalman filter, such as the Kalman filter 504 (708). The electronic device 102 provides an estimated device location based on an output of the Kalman filter 504 (710).

The output from the machine learning model 412 may indicate an amount of uncertainty for the estimated position and/or estimated uncertainty for raw measurements. For example, these output uncertainties may then be used in the measurement noise model of the Kalman filter, as follows:

$$x_k = F_k x_{k-1} + B_k u_k + w_k$$

$$w_k \sim N(0, Q_k).$$

where x is the hidden state to be estimated (e.g., the position), w is the process noise associated with the dynamics of x. When w is large (e.g., based on a predefined value), this may signify that the movement of the user is less known. For example, w may be assumed to be a vector of values drawn from a normal distribution with 0 mean, and variance of Q.

In addition:

$$z_k = H_k x_k + v_k$$

$$v_k \sim N(0, R_k)$$

where z is the measurements available from the electronic device (e.g., pseudorange and range rate). This may be assumed to be derived from the hidden state x, but with noise v added onto them. The noise has 0 mean, and variance of R.

In one or more implementations, the assumed magnitude of the noise on the measurement may be modified. If R is large (e.g., based on a predefined value), this may suggest the measurement has a lot of error. If R is small (e.g., based on a predefined value), this may suggest that the measurement is more accurate.

The machine learning model (e.g., the machine learning model 412), derived from the raw measurement errors, may indicate how much to trust the measurement (e.g., via a confidence score), based on other information available (e.g., azimuth, elevation, coarse position, C/n0, multipath indicator, and the like).

In one or more implementations, R may be used as follows:

$$S_k = R_k + H_k P_{k|k-1} H_k^T$$

where S represents how much "innovation" the measurement may be expected to have, given how much noise is expected on the measurement, together with how unknown the state is. In one or more implementations, the state's distribution is N(0,P), e.g., zero mean, with a variance of P. In addition:

$$K_k = P_{k|k-1} H_k^T S_k^{-1}$$

$$\hat{x}_{k|k} = \hat{x}_{k|k-1} + K_k \tilde{y}_k$$

$$P_{k|k} = (I - K_k H_k) P_{k|k-1} (I - K_k H_k)^T + K_k R_k K_k^T$$

The Kalman gain may be determined, which may be used to update the state estimate. The Kalman gain is inversely proportional to R. When the measurement is known well (e.g., a small R, based on a predefined value), K is large, suggesting that the residual of the measurement will have a large effect on the estimated state. For example, a large R (e.g., based on a predefined value) may lead to smaller updates of the state.

Alternatively or in addition, the output from the machine learning model 412 may indicate a revised measurement for the estimated position. Alternatively or in addition, the output from the machine learning model 412 may indicate an order to use the estimated position in the Kalman filter 504, relative to other measurements used in the Kalman filter 504. Alternatively or in addition, the output from the machine learning model 412 may indicate whether the Kalman filter 504 is to disregard measurements from one or more of the GNSS satellites from which the position was estimated.

As described above, one aspect of the present technology is the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information, or publicly available information.

Figure 8:
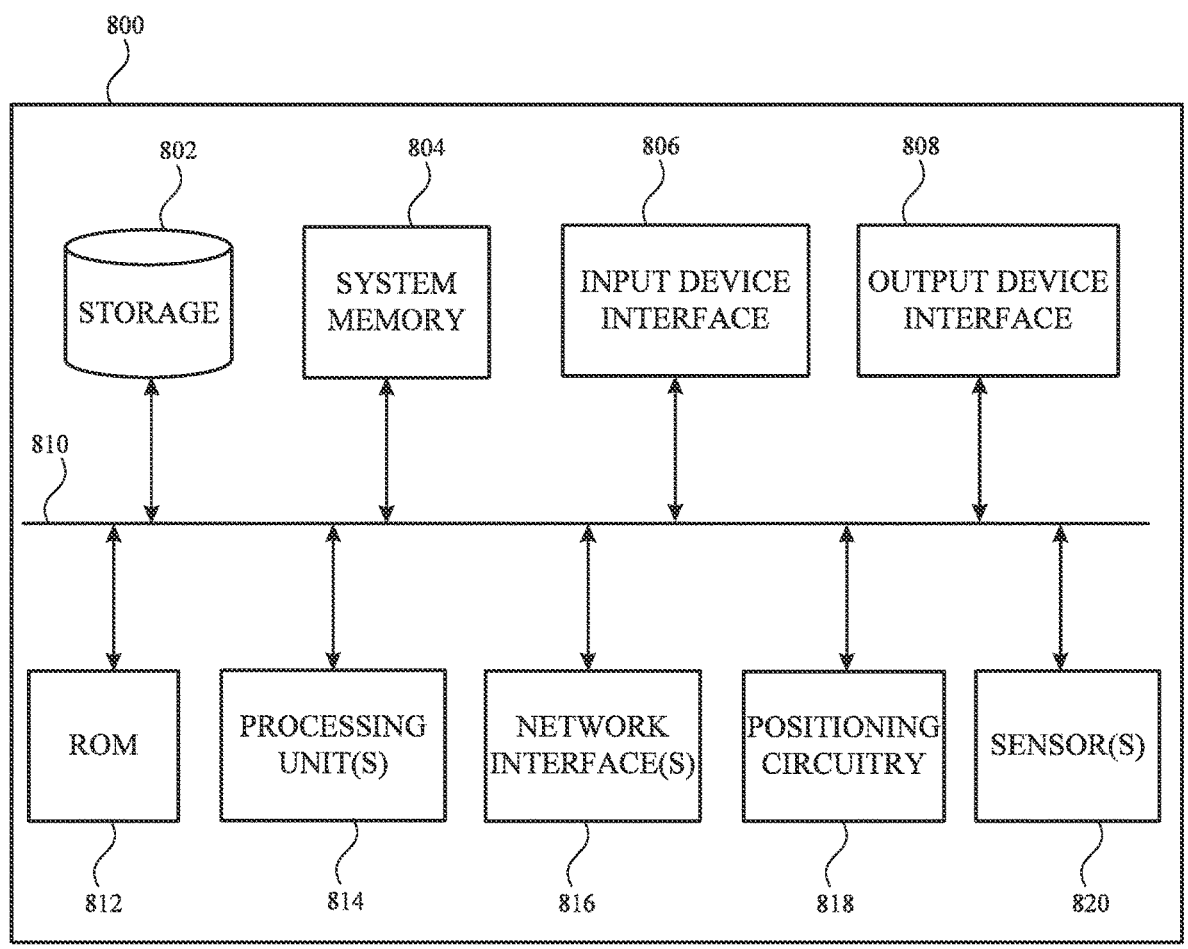
FIG. 8 illustrates an example electronic system with which aspects of the subject technology may be implemented in accordance with one or more implementations.

FIG. 8 illustrates an electronic system 800 with which one or more implementations of the subject technology may be implemented. The electronic system 800 can be, and/or can be a part of, any electronic device for generating the features and processes described in reference to FIGS. 1-3, including but not limited to a laptop computer, tablet computer, smartphone, and wearable device (e.g., smartwatch, fitness band). The electronic system 800 may include various types of computer readable media and interfaces for various other types of computer readable media. The electronic system 800 includes one or more processing unit(s) 814, a permanent storage device 802, a system memory 804 (and/or buffer), an input device interface 806, an output device interface 808, a bus 810, a ROM 812, one or more processing unit(s) 814, one or more network interface(s) 816, positioning circuitry 818, sensor(s) 820, and/or subsets and variations thereof.

The bus 810 collectively represents all system, peripheral, and chipset buses that communicatively connect the numerous internal devices of the electronic system 800. In one or more implementations, the bus 810 communicatively connects the one or more processing unit(s) 814 with the ROM 812, the system memory 804, and the permanent storage device 802. From these various memory units, the one or more processing unit(s) 814 retrieves instructions to execute and data to process in order to execute the processes of the subject disclosure. The one or more processing unit(s) 814 can be a single processor or a multi-core processor in different implementations.

The ROM 812 stores static data and instructions that are needed by the one or more processing unit(s) 814 and other modules of the electronic system 800. The permanent storage device 802, on the other hand, may be a read-and-write memory device. The permanent storage device 802 may be a non-volatile memory unit that stores instructions and data even when the electronic system 800 is off. In one or more implementations, a mass-storage device (such as a magnetic or optical disk and its corresponding disk drive) may be used as the permanent storage device 802.

In one or more implementations, a removable storage device (such as a floppy disk, flash drive, and its corresponding disk drive) may be used as the permanent storage device 802. Like the permanent storage device 802, the system memory 804 may be a read-and-write memory device. However, unlike the permanent storage device 802, the system memory 804 may be a volatile read-and-write memory, such as random access memory. The system memory 804 may store any of the instructions and data that one or more processing unit(s) 814 may need at runtime. In one or more implementations, the processes of the subject disclosure are stored in the system memory 804, the permanent storage device 802, and/or the ROM 812. From these various memory units, the one or more processing unit(s) 814 retrieves instructions to execute and data to process in order to execute the processes of one or more implementations.

The bus 810 also connects to the input and output device interfaces 806 and 808. The input device interface 806 enables a user to communicate information and select commands to the electronic system 800. Input devices that may be used with the input device interface 806 may include, for example, alphanumeric keyboards and pointing devices (also called "cursor control devices"). The output device interface 808 may enable, for example, the display of images generated by electronic system 800. Output devices that may be used with the output device interface 808 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information.

One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

The bus 810 also connects to positioning circuitry 818 and sensor(s) 820. The positioning circuitry 818 may be used in determining device location based on positioning technology. For example, the positioning circuitry 818 may provide for one or more of GNSS positioning, wireless access point positioning, cellular phone signal positioning, Bluetooth signal positioning, image recognition positioning, and/or an INS (e.g., via motion sensors such as an accelerometer and/or gyroscope).

In one or more implementations, the sensor(s) 820 may be utilized to detect movement, travel and orientation of the electronic system 800. For example, the sensor(s) may include an accelerometer, a rate gyroscope, and/or other motion-based sensor(s). Alternatively or in addition, the sensor(s) 820 may include one or more audio sensors(s) and/or image-based sensor(s) for determining device position. In another example, the sensor(s) 820 may include a barometer which may be utilized to detect atmospheric pressure (e.g., corresponding to device altitude).

Finally, as shown in FIG. 8, the bus 810 also couples the electronic system 800 to one or more networks and/or to one or more network nodes through the one or more network interface(s) 816. In this manner, the electronic system 800 can be a part of a network of computers (such as a LAN, a wide area network ("WAN"), or an Intranet, or a network of networks, such as the Internet. Any or all components of the electronic system 800 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
   receiving an estimated position of a first device based on a positioning system comprising a Global Navigation Satellite System (GNSS) satellite;
   receiving a set of parameters associated with the estimated position, the set of parameters comprising at least one parameter corresponding to a position of the first device relative to the GNSS satellite;
   receiving a reference position of the first device based on a reference positioning system;
   training a machine learning model based on the estimated position, the reference position and the set of parameters; and
   providing the machine learning model to estimate device location of a second device based on a subsequent position provided by the positioning system.

2. The method of claim 1, wherein providing the machine learning model comprises providing the machine learning model to the second device, for local storage on the second device.

3. The method of claim 1, wherein the subsequent position and an output from the machine learning model are provided to a Kalman filter to estimate device location.

4. The method of claim 3, wherein the output from the machine learning model indicates an amount of uncertainty for the subsequent position.

5. The method of claim 3, wherein the output from the machine learning model indicates an amount of uncertainty for a measurement used for device positioning.

6. The method of claim 3, wherein the output from the machine learning model indicates a revised measurement for the subsequent position.

7. The method of claim 3, wherein the output from the machine learning model indicates an order to use the subsequent position in the Kalman filter, relative to other measurements used in the Kalman filter.

8. The method of claim 3, wherein the output from the machine learning model indicates whether the Kalman filter is to disregard measurements from the GNSS satellite.

9. The method of claim 1, wherein the set of parameters comprise at least one of an azimuth, an elevation, a pseudorange, an uncertainty associated with the pseudorange, a range rate, an uncertainty associated with the range rate or a multipath flag.

10. The method of claim 9, wherein the set of parameters further comprise at least one of a satellite identifier for the GNSS satellite, a measurement latency, a carrier tracking state, a position fix location, an uncertainty associated with the position fix location, a number of satellites used in a position fix, or a horizontal dilution of precision.

11. The method of claim 1, wherein the subsequent position provided by the positioning system comprises measurement errors.

12. A computer program product comprising code stored in a tangible computer-readable storage medium, the code comprising:
    code to receive an estimated position of a first device based on a positioning system comprising a Global Navigation Satellite System (GNSS) satellite;
    code to receive a set of parameters associated with the estimated position, the set of parameters comprising at least one parameter corresponding to a position of the first device relative to the GNSS satellite;
    code to receive a reference position of the first device based on a reference positioning system;
    code to train a machine learning model based on the estimated position, the reference position and the set of parameters; and
    code to provide the machine learning model to a second device, to estimate device location of the second device based on a subsequent position of the second device as provided by the positioning system.

13. The computer program product of claim 12, wherein the subsequent position and an output from the machine learning model are provided to a Kalman filter to estimate device location.

14. The computer program product of claim 13, wherein the output from the machine learning model indicates at least one of: an amount of uncertainty for the subsequent position, an amount of uncertainty for a measurement used for device positioning, a revised measurement for the subsequent position, an order to use the subsequent position in the Kalman filter, relative to other measurements used in the Kalman filter, or whether the Kalman filter is to disregard measurements from the GNSS satellite.

15. A device comprising:
    a memory; and
    at least one processor configured to:
        receive an estimated position of a first device based on a positioning system comprising a Global Navigation Satellite System (GNSS) satellite;
        receive a set of parameters associated with the estimated position, the set of parameters comprising at least one parameter corresponding to a position of the first device relative to the GNSS satellite;
        receive a reference position of the first device based on a reference positioning system;
        train a machine learning model based on the estimated position, the reference position and the set of parameters; and
        provide the machine learning model to estimate device location of a second device based on a subsequent position provided by the positioning system.

16. The computer program product of claim 12, wherein the set of parameters comprise at least one of: an azimuth, an elevation, a pseudorange, an uncertainty associated with the pseudorange, a range rate, an uncertainty associated with the range rate or a multipath flag.

17. The device of claim 15, wherein the at least one processor is further configured to provide the machine learning model to the second device, for local storage on the second device.

18. The device of claim 15, wherein the subsequent position and an output from the machine learning model are provided to a Kalman filter to estimate device location.

19. The device of claim 18, wherein the output from the machine learning model indicates at least one of: an amount of uncertainty for the subsequent position, an amount of uncertainty for a measurement used for device positioning, a revised measurement for the subsequent position, an order to use the subsequent position in the Kalman filter, relative to other measurements used in the Kalman filter, or whether the Kalman filter is to disregard measurements from the GNSS satellite.

20. The device of claim 15, wherein the set of parameters comprise at least one of: an azimuth, an elevation, a pseudorange, an uncertainty associated with the pseudorange, a range rate, an uncertainty associated with the range rate or a multipath flag.

* * * * *